(12) United States Patent
Campbell

(10) Patent No.: US 7,032,969 B1
(45) Date of Patent: Apr. 25, 2006

(54) BOOSTER SEAT WITH ADJUSTABLE SEAT BACK

(75) Inventor: Jerry Wayne Campbell, Rock Hill, SC (US)

(73) Assignee: Britax Child Safety, Inc., Charlotte, NC (US)

( * ) Notice: Subject to any disclaimer, the term of this patent is extended or adjusted under 35 U.S.C. 154(b) by 0 days.

(21) Appl. No.: 11/161,833

(22) Filed: Aug. 18, 2005

(51) Int. Cl.
*A47C 1/08* (2006.01)

(52) U.S. Cl. .................... 297/256.1; 297/353
(58) Field of Classification Search ............. 297/256.1, 297/353, 250.1
See application file for complete search history.

(56) References Cited

U.S. PATENT DOCUMENTS

| | | | |
|---|---|---|---|
| 5,466,043 A | 11/1995 | Lambert et al. | |
| 2002/0043840 A1 | 4/2002 | Kain | |
| 2003/0151282 A1* | 8/2003 | Williams et al. | 297/250.1 |
| 2004/0189068 A1* | 9/2004 | Meeker et al. | 297/250.1 |
| 2004/0245822 A1 | 12/2004 | Balenslefer, II et al. | |
| 2005/0200177 A1 | 9/2005 | Balenslefer, II et al. | |
| 2005/0212342 A1 | 9/2005 | Kaln et al. | |
| 2005/0225136 A1* | 10/2005 | Horton et al. | 297/250.1 |

FOREIGN PATENT DOCUMENTS

| | | | |
|---|---|---|---|
| EP | 0155784 | * | 9/1985 |
| JP | 5-254366 | * | 10/1993 |

* cited by examiner

*Primary Examiner*—Milton Nelson, Jr.
(74) *Attorney, Agent, or Firm*—Adams Evans P.A.

(57) ABSTRACT

A booster seat having seat back carried by a seat bottom. The seat back includes first and second frame members mounted for slidable movement relative to each other. A flexible band interconnects the first and second frame members wherein relative movement between the first and second frame members causes movement of the band relative to the second frame member. A lock is provided for being carried by one of the first or second frame members for engaging cooperation with the band. The lock is reciprocable between a locked position wherein the lock locks the band against movement, and an unlocked position wherein the lock releases the band and allows movement of the second frame member relative to the first frame member, thereby adjusting the height of the seat back.

18 Claims, 16 Drawing Sheets

BOOSTER SEAT WITH ADJUSTABLE SEAT BACK

TECHNICAL FIELD AND BACKGROUND OF THE INVENTION

This invention relates to a child's booster seat with an adjustable seat back. Booster seats are now required for transporting children of specified ages, such as ages 2–6, in a vehicle, and are generally secured to the vehicle seat by the vehicle seat seatbelt or by some other means. Because of the relatively wide range of ages and thus sizes that the booster seat will accommodate, it is necessary to allow adjustment of the seat back to properly position the lumbar area of the seat occupant on the seat back and the head of the occupant on the headrest positioned at the top of the seat back.

The seat disclosed and claimed in this application has features that facilitate easy adjustment of the seat back whether or not the seat is secured to a vehicle seat and whether or not the seat is occupied. As will be apparent from the following description, the features of the booster seat also have application in other seating products, and the locks have application in other devices where securely locking a band against movement in both directions is necessary or desirable.

SUMMARY OF THE INVENTION

Therefore, it is an object of the invention to provide a booster seat that has an easily adjustable backrest.

It is another object of the invention to provide a booster seat that has a backrest that can be securely locked against movement in both the up and down direction.

It is another object of the invention to provide a booster seat that allows easy adjustment from the front or side of the seat back.

These and other objects of the present invention are achieved in the preferred embodiments disclosed below by providing a booster seat, comprising a seat bottom for being supported on a vehicle seat and a seat back carried by the seat bottom for providing back support to the seat occupant. The seat back comprises a first frame member and a second frame member mounted for slidable movement relative to the first frame member. A flexible band interconnects the first and second frame members whereby relative movement between the first and second frame members causes movement of the band relative to the second frame. A lock is provided for being carried by one of the first or second frame members for engaging cooperation with the band. The lock is reciprocable between a locked position wherein the lock locks the band against movement in first and second opposing directions of the second frame member, and an unlocked position wherein the lock releases the band and allows movement of the second frame member in first and second opposing directions relative to the first frame member thereby adjusting the height of the seat back.

According to one preferred embodiment of the invention, the band includes two opposed end portions stationarily mounted to the first frame member.

According to another preferred embodiment of the invention, the second frame member includes two longitudinally spaced-apart slots for receiving the band therethrough.

According to yet another preferred embodiment of the invention, the lock comprises a lock housing including a slot therein for receiving the band therethrough, whereby in the locked position the band is frictionally-engaged by the lock housing, and whereby in the unlocked position the band is released from frictional locking engagement with the lock member.

According to yet another preferred embodiment of the invention, the lock comprises a lock housing having a void therein, and a rotatable lock member mounted in the void of the lock housing. The lock member includes a slot therein for receiving the band therethrough, whereby in the locked position the band is frictionally-engaged by the lock housing, and whereby in the unlocked position the band is released from frictional locking engagement with the lock member.

According to yet another preferred embodiment of the invention, the lock housing includes a generally annular interior surface and the lock member includes a generally annular exterior surface.

According to yet another preferred embodiment of the invention, a booster seat is provided wherein the lock housing includes a void defining a generally cylindrical interior surface and first and second opposed slots communicating through the lock housing with the void for receiving the band through the first slot, the void and through the second slot. The lock member includes a cylindrical exterior surface mounted in the void of the lock housing interior surface of the lock housing and defines a space between the cylindrical interior and exterior surfaces. The space and the thickness of the band is such as to provide progressively greater frictional engagement between the respective exterior and interior surfaces as the lock member is rotated from the unlocked to the locked positions.

According to yet another preferred embodiment of the invention, the lock housing includes first and second opposed slots positioned for alignment with the slot in the rotatable lock member when the lock is in the unlocked position and positioned for a misalignment with the slot in the rotatable lock member of about 90 degrees in the locked position.

According to yet another preferred embodiment of the invention, the lock includes a handle carried by the rotatable lock member for manually moving the lock member between locked and unlocked positions.

According to yet another preferred embodiment of the invention, the lock comprises first and second lock members positioned adjacent each other and having a respective band-engaging element defining a slot therebetween for receiving the band therethrough. A void is formed by facing surfaces of the lock members and is sufficiently large to permit free passage of the band through the void in both the locked and unlocked lock positions. A lock operator cooperates with the lock members for moving the lock members towards each other into the locked position whereby the band is clamped between the band-engaging elements. Moving the band-engaging members away from each other into the unlocked position allows the band to move freely past the band-engaging elements.

According to yet another preferred embodiment of the invention, the lock members comprise blocks, at least one of the blocks having a concavity defining the void.

According to yet another preferred embodiment of the invention, the lock members comprise first and second blocks, each of the first and second blocks having a concavity, the respective concavities collectively defining the void.

According to yet another preferred embodiment of the invention, the lock comprises first and second lock members positioned adjacent each other and having first and second pairs of spaced-apart band-engaging elements defining a slot therebetween for receiving the band therethrough. A void is formed by facing surfaces of the lock members intermediate the first and second pairs of band-engaging elements. The void is sufficiently large to permit free passage of the band through the void in both the locked and unlocked lock positions. A lock operator cooperates with the lock members for moving the lock members towards each other into the locked position whereby the band is clamped between the first and second pairs of band-engaging elements, and moving the band-engaging members away from each other into the unlocked position whereby the band is allowed to move freely past the first and second pairs of band-engaging elements.

According to yet another preferred embodiment of the invention, the lock members comprise blocks, and the respective concavities are formed by a pair of planar walls converging at a common intersection to define a notch.

According to yet another preferred embodiment of the invention, the lock operator comprises a cam roller.

According to yet another preferred embodiment of the invention, a booster seat is provided, and comprises a seat bottom for being supported on a vehicle seat, and a seat back carried by the seat bottom for providing back support to the seat occupant. The seat back comprises a first frame member, and a second frame member mounted for slidable movement relative to the first frame member for increasing and decreasing the effective length of the combined first frame member and second frame member. The second frame member includes two longitudinally spaced-apart slots for receiving the band therethrough. A headrest is carried at a top end of the second frame member. A flexible band interconnects the first and second frame members whereby relative movement between the first and second frame members causes movement of the band relative to the second frame. The band has two opposed end portions stationarily mounted to the first frame member. A lock is carried by one of the first or second frame members for engaging cooperation with the band. The lock is reciprocable between a locked position wherein the lock locks the band against movement in first and second opposing directions of the second frame member, and an unlocked position wherein the lock releases the band and allows movement of the second frame member in first and second opposing directions relative to the first frame member thereby adjusting the height of the seat back. The lock includes a lock housing having a slot therein for receiving the band therethrough, whereby in the locked position the band is frictionally-engaged by the lock housing, and whereby in the unlocked position the band is released from frictional locking engagement with the lock member.

According to yet another preferred embodiment of the invention, the lock comprises a lock housing having a void therein, with a rotatable lock member mounted in the void of the lock housing. The lock member includes a slot therein for receiving the band therethrough, whereby in the locked position the band is frictionally-engaged by the lock housing, and whereby in the unlocked position the band is released from frictional locking engagement with the lock member.

According to yet another preferred embodiment of the invention, one of the first and second frame members includes at least one slot therein extending along a longitudinal axis thereof, and the other of the first and second frame members includes a frame retainer extending through the slot and capturing the one of the first and second frame members for sliding movement along the axis of the slot.

BRIEF DESCRIPTION OF THE DRAWINGS

Some of the objects of the invention have been set forth above. Other objects and advantages of the invention will appear as the discussion of the invention proceeds when taken in conjunction with the following drawings, in which.

DESCRIPTION OF THE PREFERRED EMBODIMENT AND BEST MODE

Figure 1:
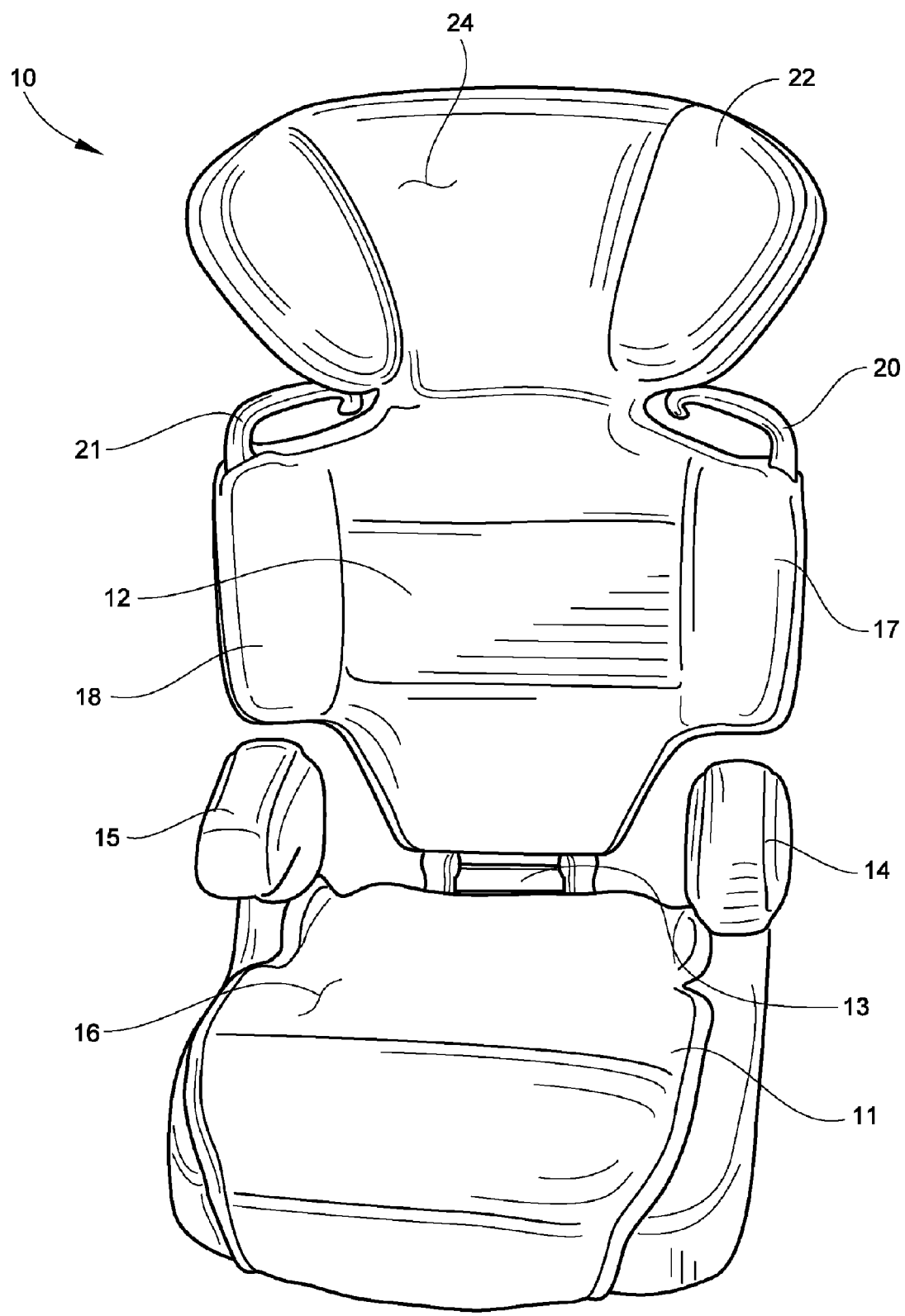
FIG. 1 is a front elevation of a child's booster seat according to one embodiment of the invention.

Referring now specifically to the drawings, a booster seat according to the present invention is illustrated in FIG. 1 and shown generally at reference numeral 10.

The seat 10 includes a seat bottom 11 that is supported on a vehicle seat when in use, and a seat back 12. The seat back 12 is pivotally-mounted to the rear of the seat bottom 11 a pivot assembly 13.

The seat bottom 11 includes a pair of arm rests 14, 15, and is covered with conventional padding and dress cover 16. The seat back 12 includes side bolsters 17, 18, seat belt guides 20, 21 and a headrest 22. The seat back 12 is also covered by conventional padding and dress cover 24.

Figure 2:
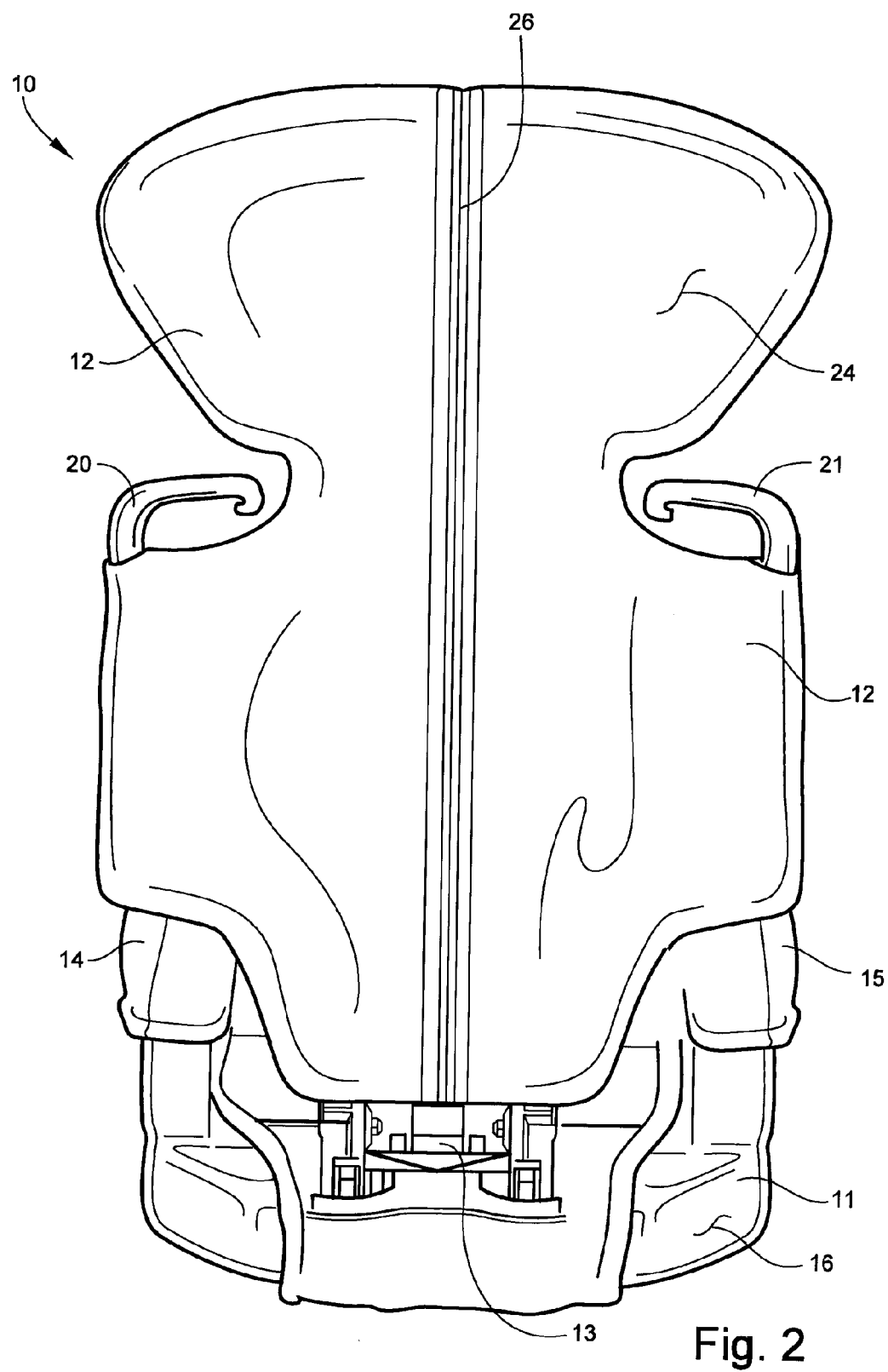
FIG. 2 is a rear elevation of the booster seat shown in FIG. 1.
Figure 3:
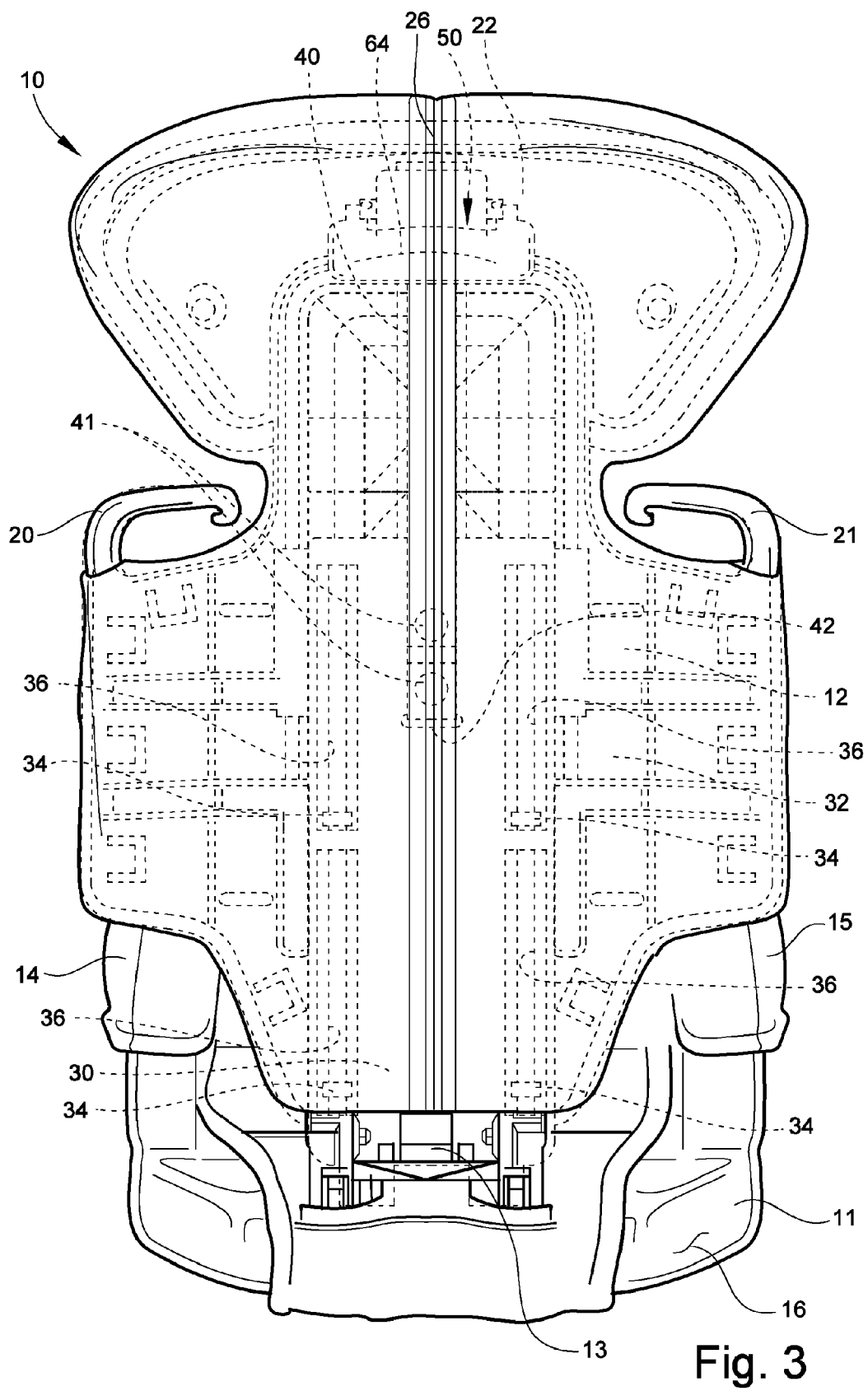
FIG. 3 is a rear elevation according to FIG. 2, with the operating components of the seat shown in phantom through the rear dress cover of the seat.
Figure 4:
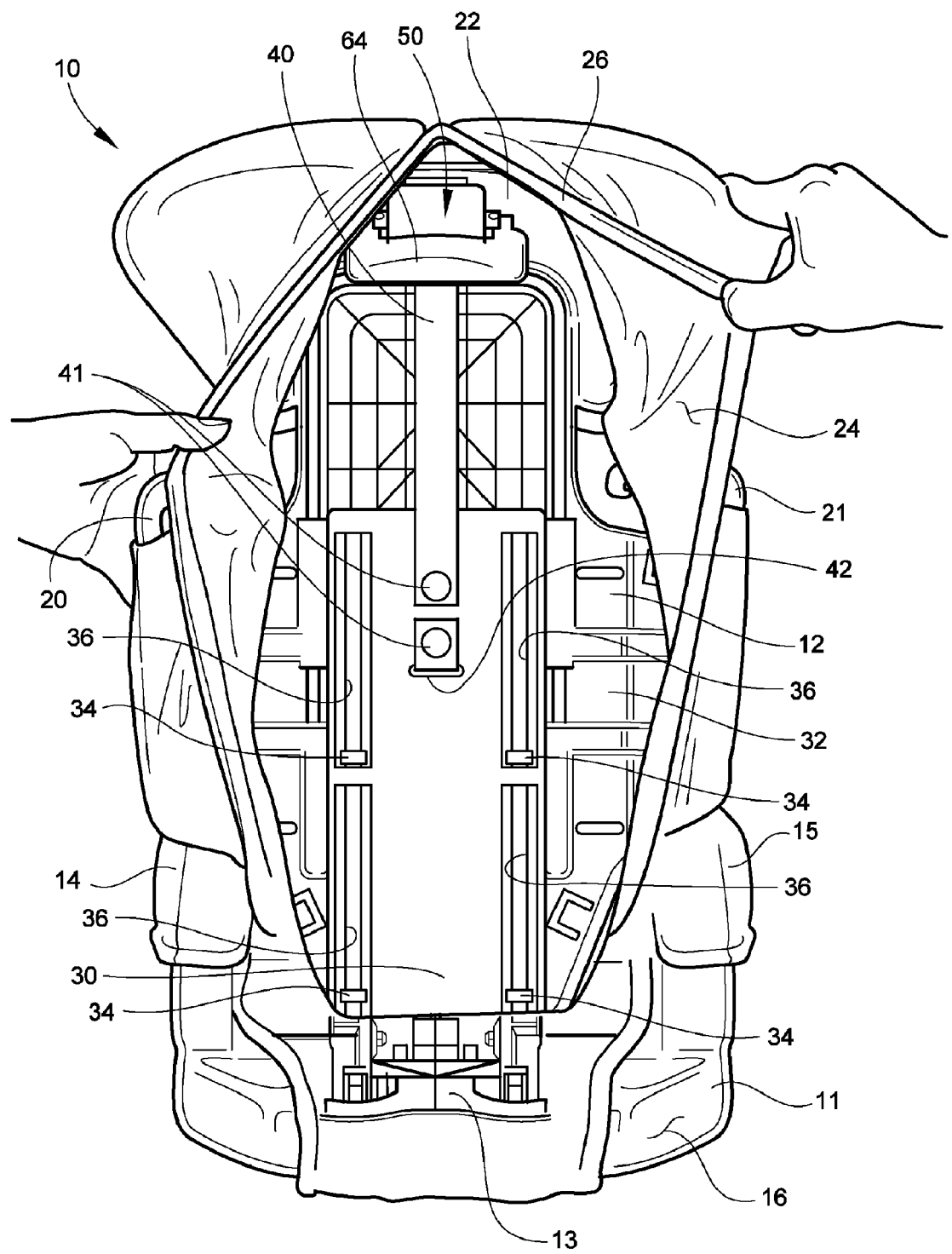
FIG. 4 is a rear elevation according to FIG. 2, with the dress cover opened and pulled aside to show the operating components of the seat.

As is shown in FIGS. 2, 3 and 4, the rear of the seat back 12 is also covered by the dress cover 24, and access is gained to the operating components described below by opening the dress cover 24 by means of a zipper 26. As is best shown in FIG. 4, the operating components of the seat back 12 can be exposed when the dress cover 24 is unzipped and spread apart along the line of the zipper 26.

Referring now to FIGS. 4–7, the seat back 12 is formed from two frame members 30 and 32, preferably formed of high density molded plastic. The frame member 30 is mounted for pivotal movement on the seat bottom 11. The frame member 32 is mounted for sliding movement relative to the frame member 30 by means of frame retainers, such as studs with enlarged heads 34, that are captured in and ride in respective vertically-extending slots 36 formed in and extending along the longitudinal axis of the frame member 30. The stationary frame member 30 and the sliding frame member 32 preferably include integrally-molded stiffening ridges of increased thickness for providing strength and rigidity.

Figure 5:
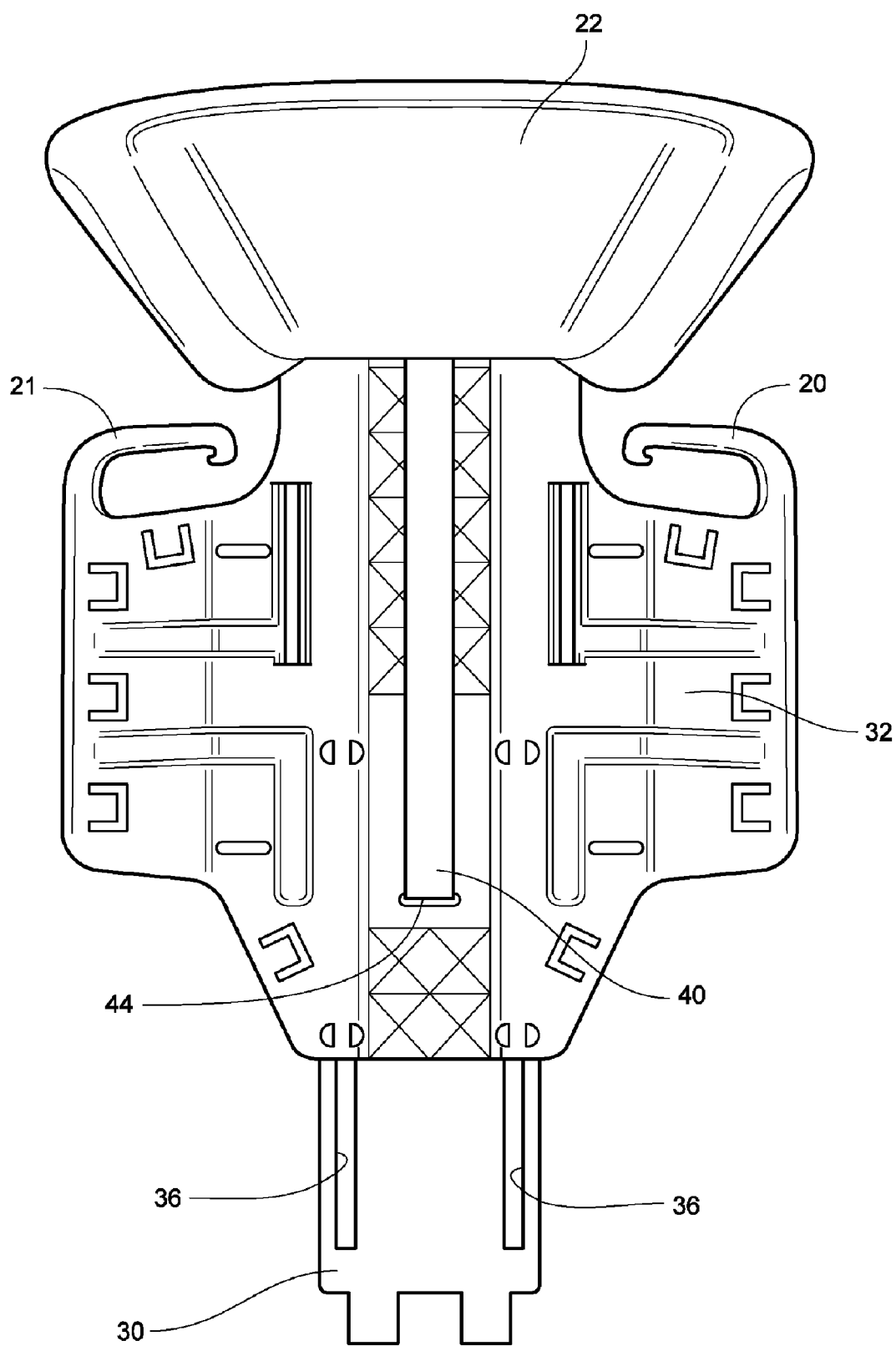
FIG. 5 is a front elevation of the frame members of the seat back.
Figure 6:
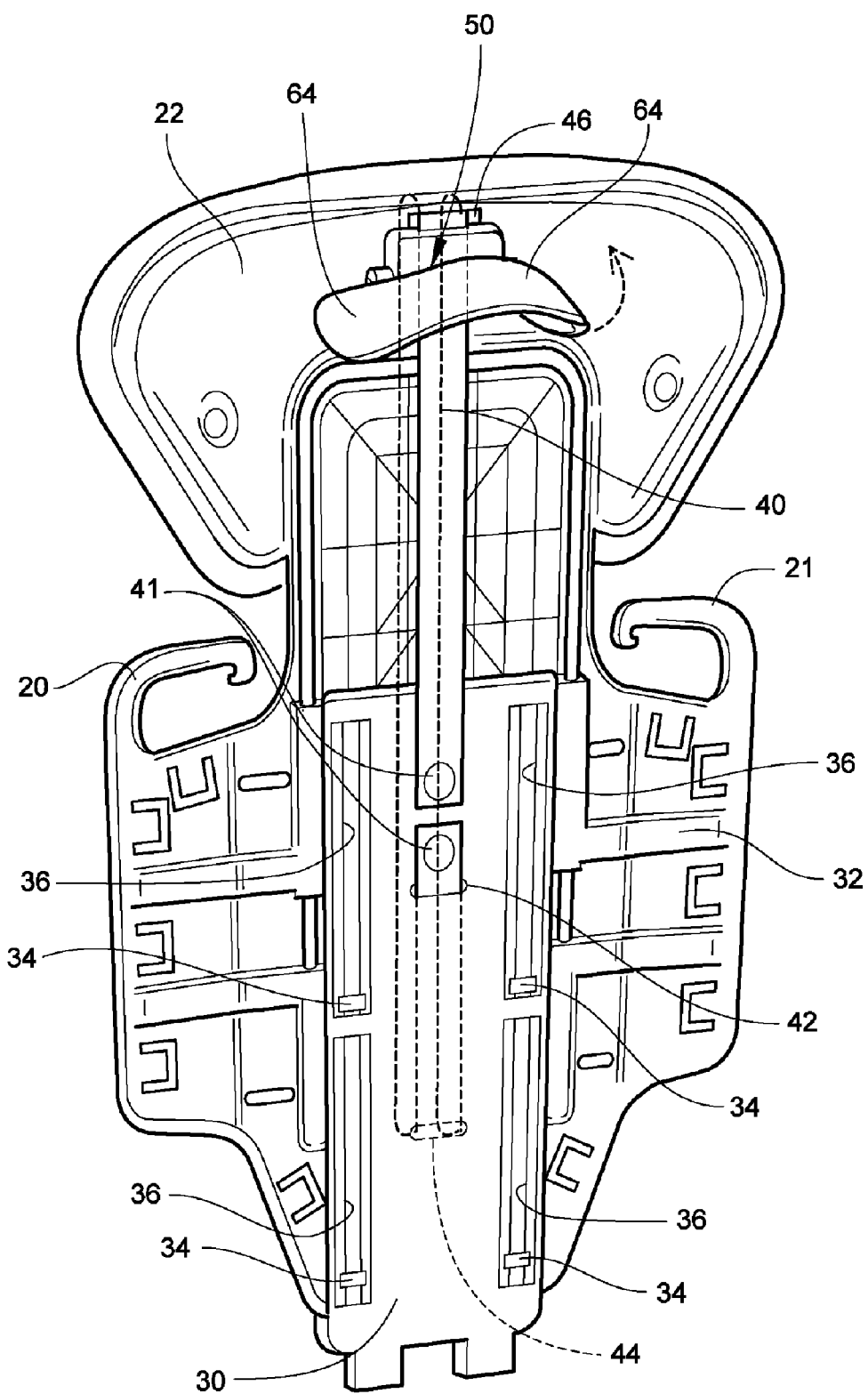
FIG. 6 is a rear perspective view of the frame members of the seat back with the seat back in a lowered position.
Figure 7:
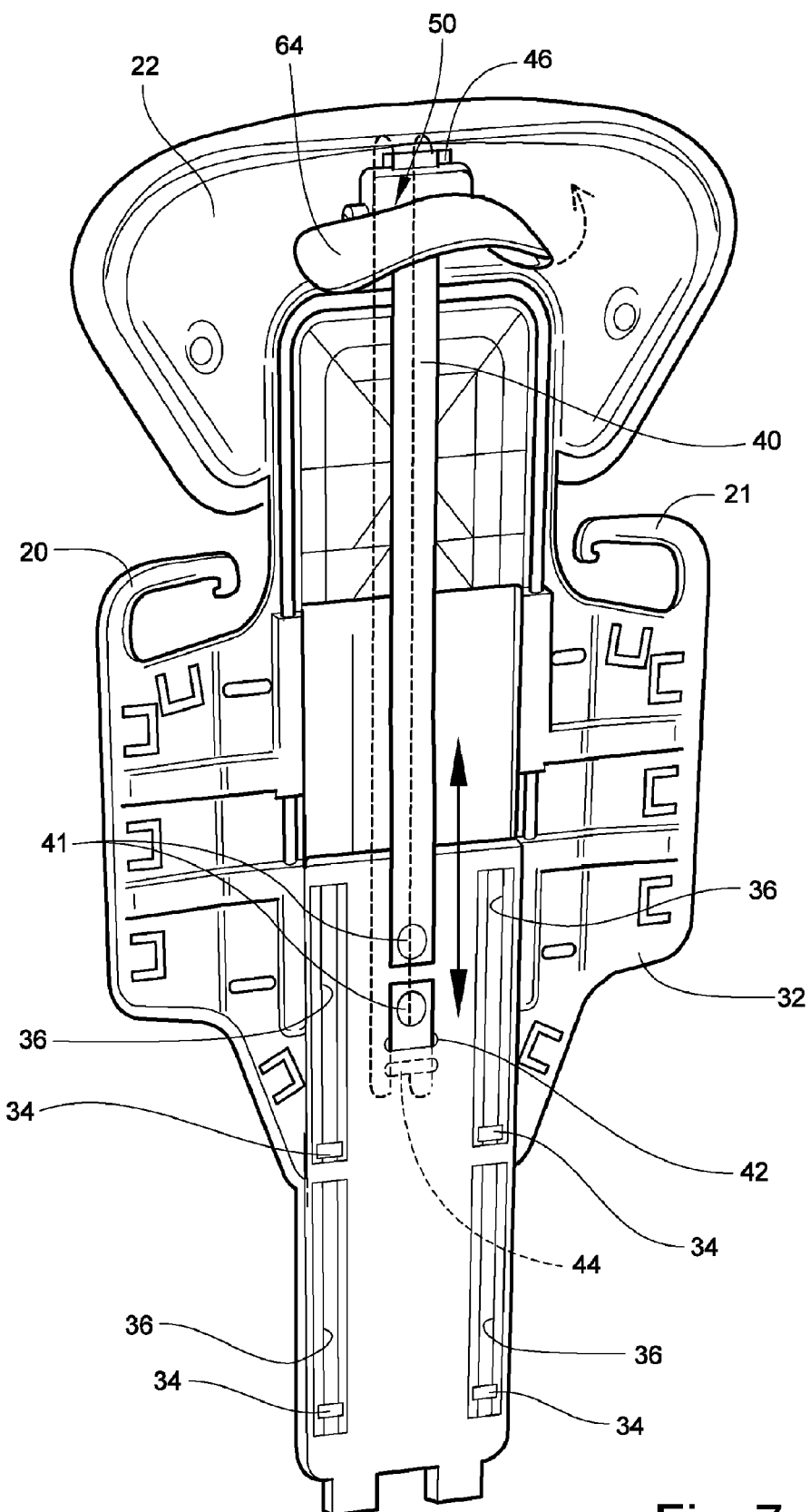
FIG. 7 is a rear perspective view of the frame members of the seat back with the seat back in a raised position.

By comparing FIG. 4, a view from the rear, with FIG. 5, a view from the front, it will be observed that the stationary frame member 30 is positioned to the rear of the sliding frame member 32. The studs 34 and cooperating slots 36 provide no means of fixing the position of the seat back 12 at any particular location relative to the seat bottom 11. This function is provided by a band 40. The band 40, which is preferably a thin woven tape, but may be any suitable web, tape, belt, cord or strand, is attached at opposite ends to the frame member 30 by rivets 41, or by grommets, brads, screws, bolts or other suitable attachment means. As is shown by continued reference to FIGS. 4–7, frame member 30 includes a single, laterally-extending slot 42, and the frame member 32 includes two vertically spaced-apart slots 44, 46 that enable the band 40 to extend along the front side of the frame member 32 between the slots 44, 46, pass through the slots 44, 46 and extend along the rear side of the frame member 32 to its attachment points on the frame member 30. The length of the band 40 is sufficient to maintain the tape relatively taut. As the frame member 32 is moved upwardly and downwardly relative to the frame member 30, the band 40 is fed out of one of the slots 44, 46 and into the other slot 44, 46. Thus, at any given position of the frame member 32 relative to the frame member 30, a specific point along the length of the band 40 is positioned near the upper slot 46 of the frame member 32. Compare FIGS. 6 and 7. Thus, the desired vertical position of the frame member 32 and thus the seat back 12 can be maintained by locking the band 40 at this desired position, thus preventing movement of the frame member 32.

Fixing the band 40 at the desired position may be accomplished by any suitable locking means. Two alternative locks 50 and 70 are illustrated in FIGS. 8–15 and 16–19, respectively. The lock 50 illustrated in FIGS. 8–15 is shown generally in, for example, FIGS. 6 and 7. Both locks 50 and 70 are mounted to the frame member 32 adjacent the upper slot 46.

Figure 8:
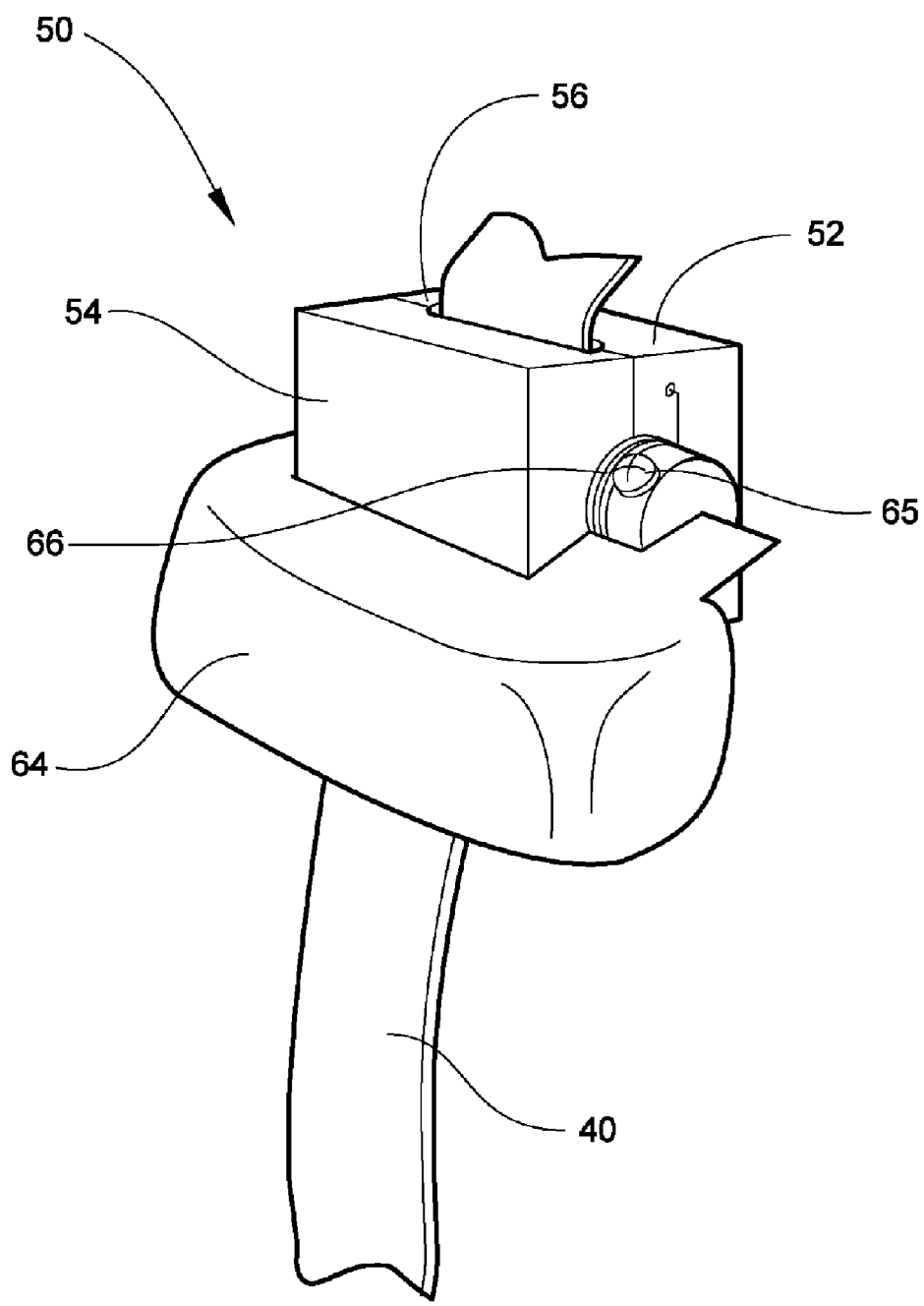
FIG. 8 is a perspective view of a seat back lock according to one embodiment.
Figure 9:
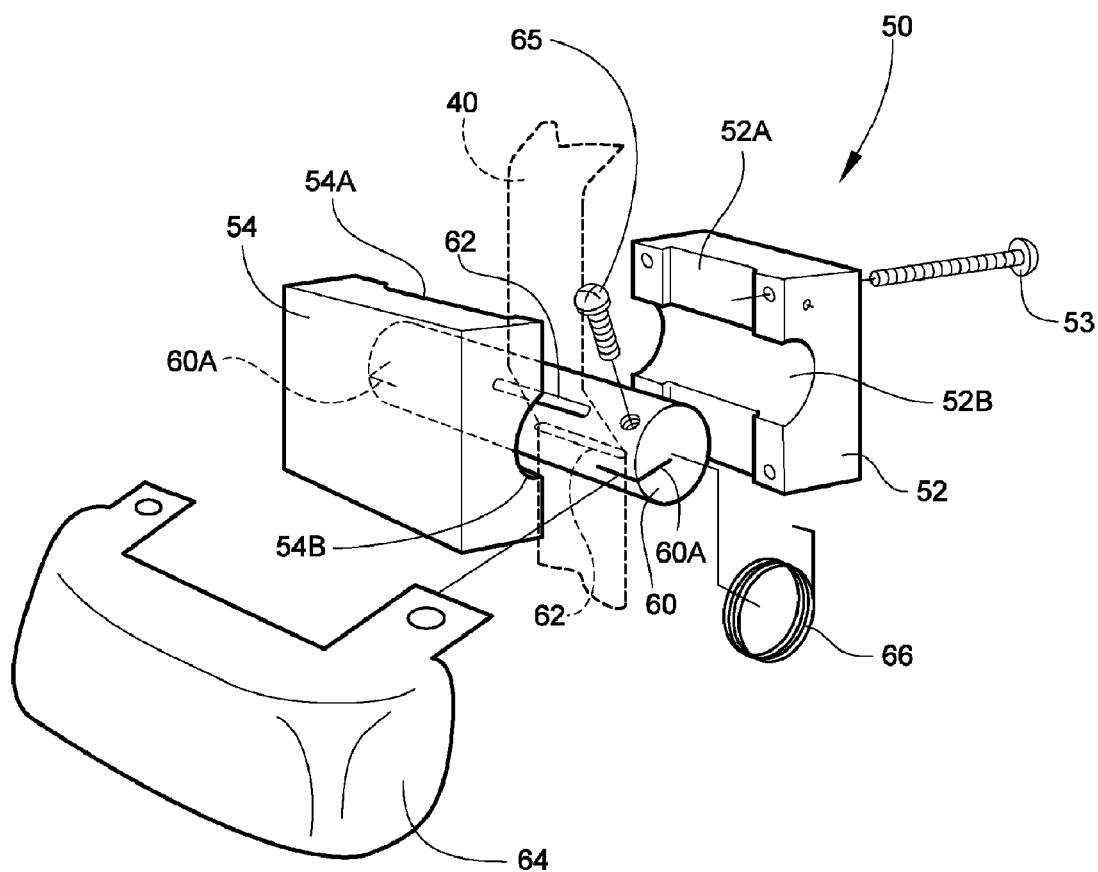
FIG. 9 is an exploded perspective view of the lock shown in FIG. 8.
Figure 10:
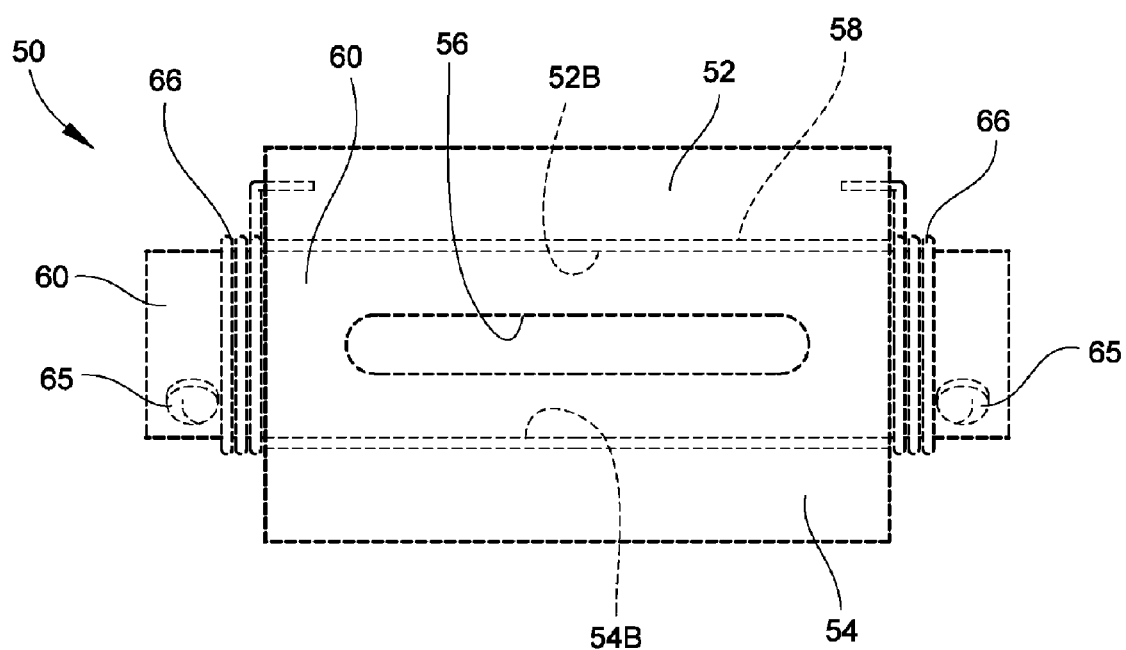
FIG. 10 is a front elevation of the lock shown in FIG. 8, with the handle removed for clarity.

Referring now to FIGS. 8–10, the lock 50 is shown and further described. Lock 50 includes lock housings 52, 54 that have recesses 52A, 54A, respectively, that collectively form a slot 56 extending through the lock housings 52, 54 between the top and the bottom. Lock housings 52, 54 also include semi-cylindrical voids 52B, 54B, respectively, that collectively form a transverse cylindrical bore 58 into which is positioned a cylindrical, rotatable lock member 60. The lock 50 is attached to the frame member 32 with screws 53 or other suitable fasteners.

Lock member 60 has a band slot 62 that extends through the diameter thereof and receives the band 40 therethrough. The diameter of the bore 58 is greater than the lock member 60 by an amount just sufficient allow frictional contact passage of the band 40 between them without binding. A handle 64 is received in slots 60A in the lock member 60 and attached by screws 65, as shown. Coil springs 66 positioned on the lock member 60 bias the handle 64 in the down, locked position.

Figure 11:
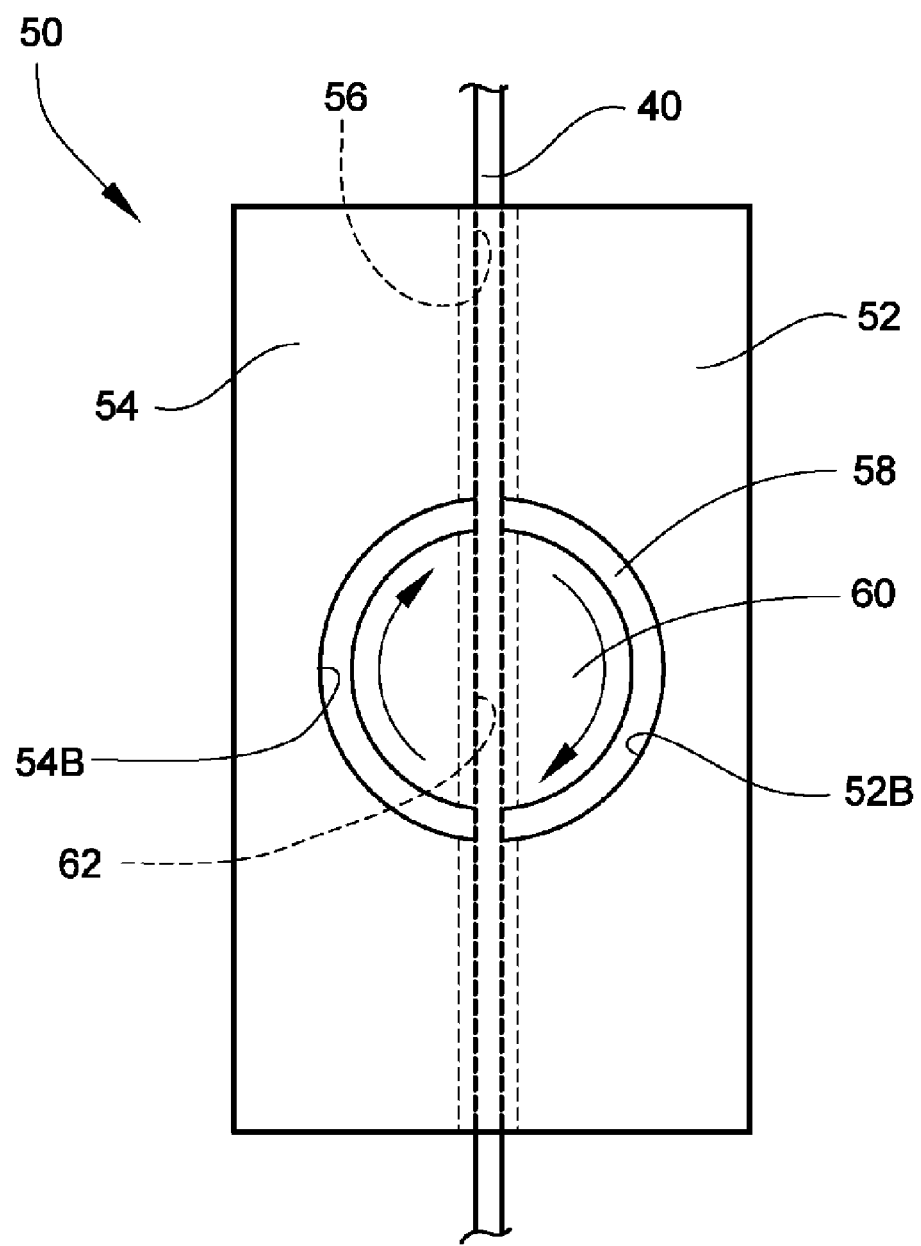
FIGS. 11 and 12 are side elevations showing the lock in the unlocked (FIG. 11) and the locked (FIG. 12) positions.
Figure 12:
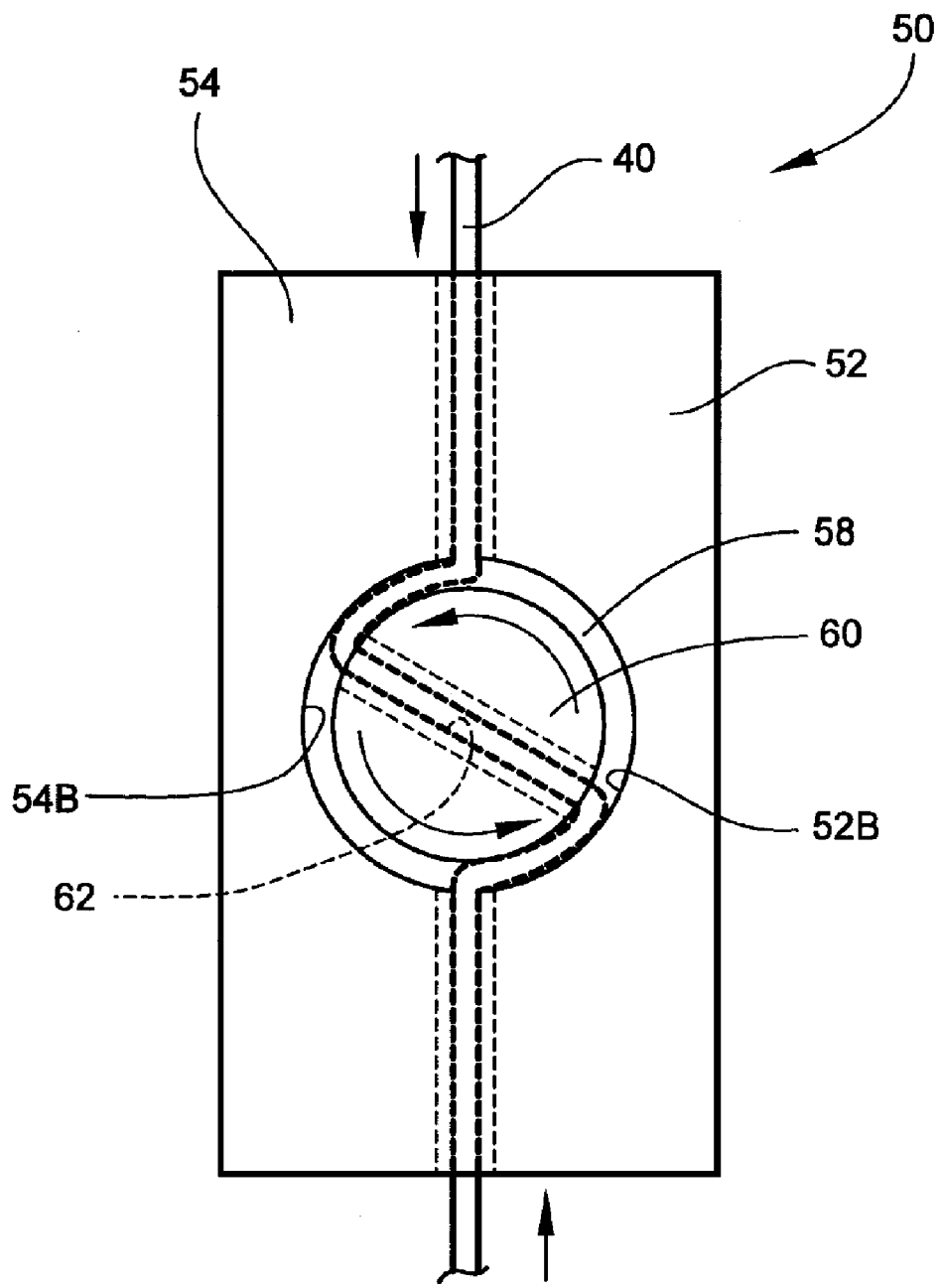
Figure 13:
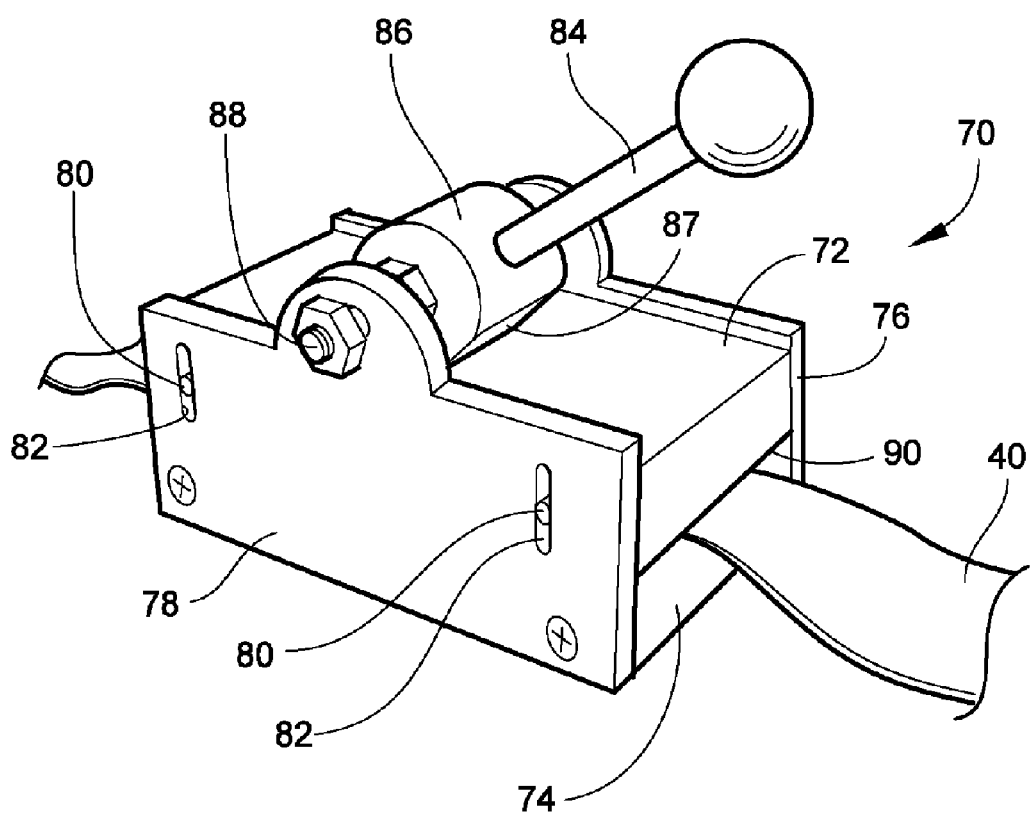
FIG. 13 is a perspective view of a lock for the booster seat in accordance with another embodiment of the invention.

Operation of the lock 50 is shown in FIGS. 11–12. The slot 56 in the lock housings 52, 54 is wide and long enough to allow free passage of the band 40 therethrough, as is the slot 62 through the diameter of the cylindrical lock member 60. Thus, when the slots 56 and 62 are aligned, as shown in FIG. 11, the band 40 is permitted to pass freely through the lock 50, allowing the seat back 12 to be vertically adjusted.

To fix the band 40 into a particular position thereby locking the seat back 12 into the desired position, the handle 64 is used to rotate the lock member 60 and thus cause a misalignment of the slot 62 with the slot 56. As is shown in FIG. 12, this misalignment causes the band 40 to be drawn into the space between the bore 58 and the lock member 60 from both the top and bottom of the lock 50. As noted above, this space is just sufficient for the thickness of the band 40. As the lock member 60 rotates, friction between the band 40 and the walls of the bore 58 and lock member 60 increase to the point where, when then the lock member 60 has been rotated approximately 90 degrees, the friction is sufficiently great that the lock member 60 is held in the locked position, and the handle 64 is biased in the locked position, as well. As is shown by reference back to FIG. 4, the lock 50 is located under the dress cover 24, further preventing unintentional movement of the lock 50 into the unlocked position.

Referring now to FIGS. 13–16, the lock 70 may be used alternatively as a means of locking the seat back 12 into the desired position. The lock 70 includes blocks that form lock members 72, 74 held between lock plates 76, 78. Lock member 72 is mounted for sliding movement relative to lock member 74 by pins 80 that ride in slots 82 on opposite ends of the lock 70. Lock member 72 is moved between locked and unlocked positions by a operator handle 84 that rotates a cam roller 86 mounted on an axle 88. The cam roller 86 may include a flat area 87 on its peripheral surface at the point where it is in the fully locked position to maintain the cam roller 86 in the locked position unless overcome by movement of the handle 84.

Figure 14:
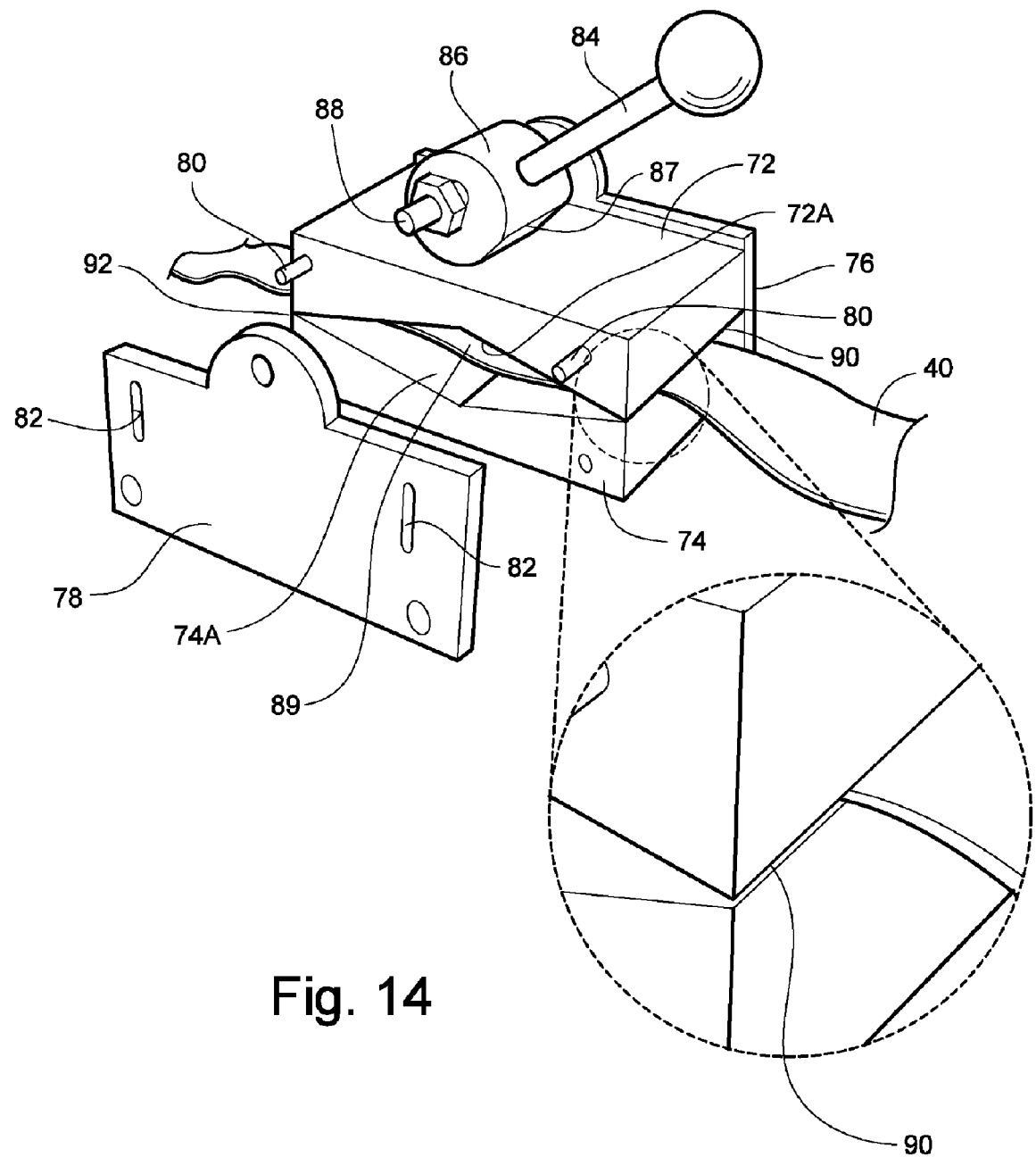
FIG. 14 is an exploded perspective view of the lock shown in FIG. 13.
Figure 15:
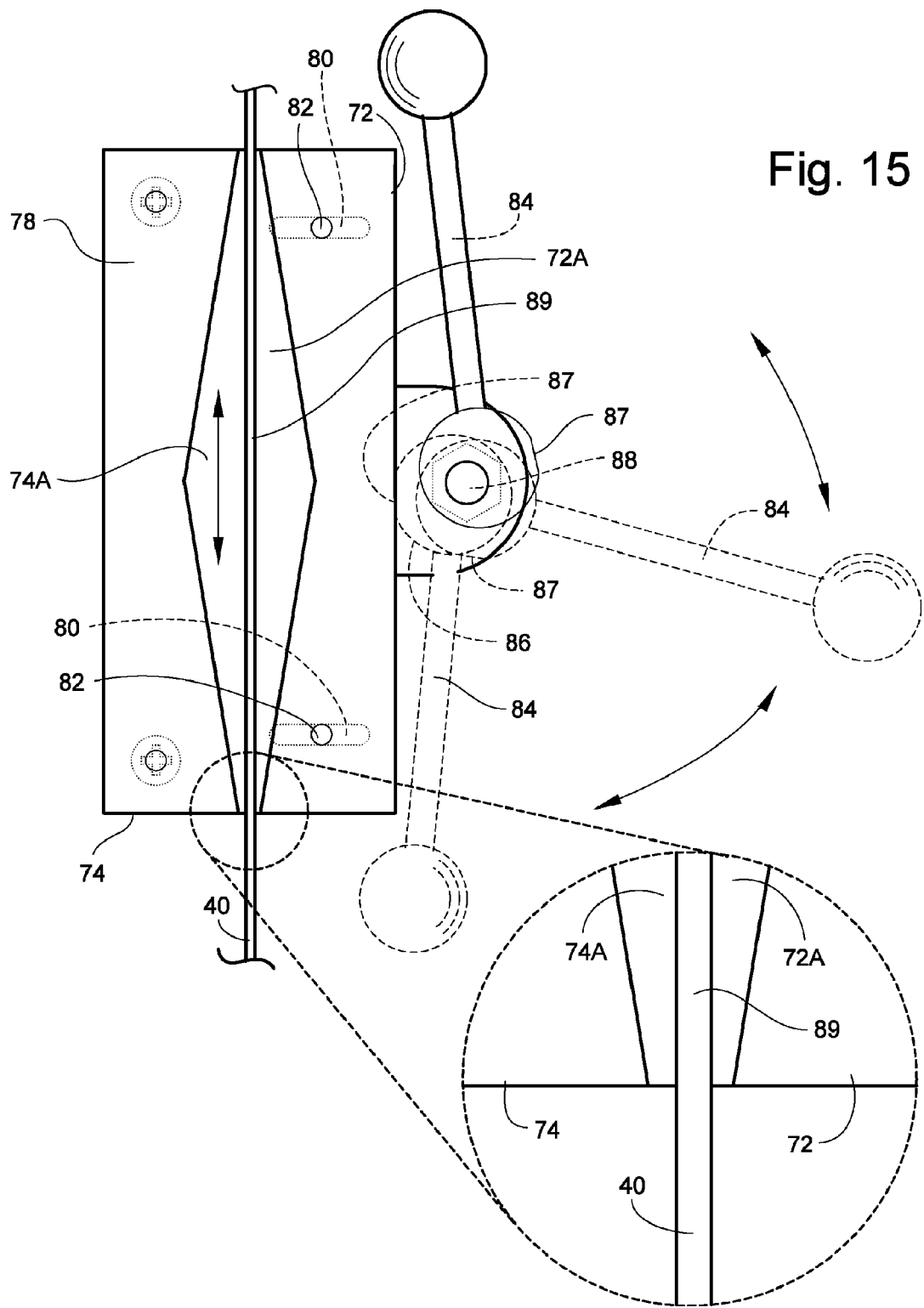
FIG. 15 is a side elevation showing the lock of FIG. 13 in the unlocked position.
Figure 16:
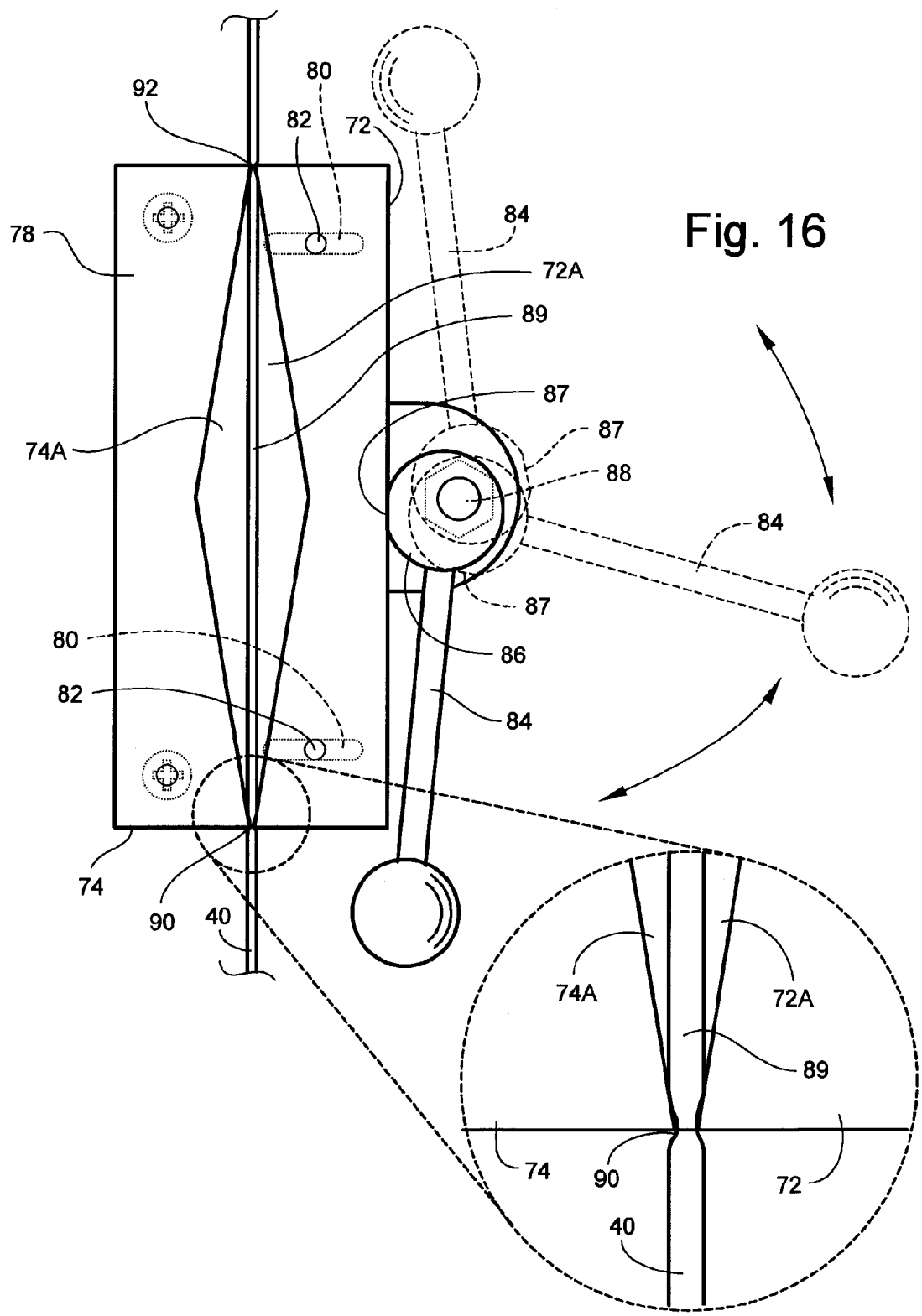
FIG. 16 is a side elevation of the lock of FIG. 13 in the locked position.

As is shown in FIGS. 14–16, the lock members 72, 74 have opposed concave surfaces 72A, 74A collectively forming a void 89. Opposing ends of the lock members 72,74 form respective slots 90, 92 therebetween. Thus, the band 40 extends through the void 89 and the slots 90, 92 on opposing ends of the lock 70. The void 89 prevents contact between the band and the lock members 72, 74 except at the extreme opposite ends where the band passes between the lock members 72, 74 and through the slots 90, 92. In the unlocked position shown in FIG. 15, the band is permitted to pass freely through the lock 70. Any contact between the lock members 72, 74 and the band 40 is insignificant and easily overcome, allowing free sliding movement of the frame member 42 of the backrest 12.

As is shown in FIG. 16, when in the locked position, the lock members 72, 74 form pinch points having very little surface area and are thus able to exert great pressure on the band 40, preventing its movement and locking the seat back 12 into the desired position.

A booster seat with an adjustable seat back is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

What is claimed is:

1. A booster seat, comprising:
   (a) a seat bottom for being supported on a vehicle seat:
   (b) a seat back carried by the seat bottom for providing back support to a seat occupant seated therein;

(c) the seat back comprising a first frame member and a second frame member mounted for slidable movement relative to the first frame member;

(d) a flexible band interconnecting the first and second frame members wherein relative movement between the first and second frame members causes movement of the band relative to the second frame member; and (e) a lock for being carried by one of the first or second frame members for engaging cooperation with the band, the lock being reciprocable between:

(1) a locked position wherein the lock locks the band against movement in first and second opposing directions of the second frame member; and (2) an unlocked position wherein the lock releases the band and allows movement of the second frame member in first and second opposing directions relative to the first frame member thereby adjusting the height of the seat back.

2. A booster seat according to claim 1, wherein the band includes two opposed end portions stationarily mounted to the first frame member.

3. A booster seat according to claim 1, wherein the second frame member includes two longitudinally spaced-apart slots for receiving the band therethrough.

4. A booster seat according to claim 1, wherein the lock comprises a lock housing including a slot therein for receiving the band therethrough, wherein in the locked position the band is frictionally-engaged by the lock housing, and wherein in the unlocked position the band is released from frictional locking engagement with the lock housing.

5. A booster seat according to claim 1, wherein the lock comprises:

(a) a lock housing having a void therein;

(b) a rotatable lock member mounted in the void of the lock housing, the lock member including a slot therein for receiving the band therethrough, whereby in the locked position the band is frictionally-engaged by the lock housing, and whereby in the unlocked position the band is released from frictional locking engagement with the lock member.

6. A booster seat according to claim 5, wherein the lock housing includes a generally annular interior surface and the lock member includes a generally annular exterior surface.

7. A booster seat according to claim 5, wherein:

(a) the void in the lock housing defining defines a generally cylindrical interior surface and first and second opposed slots communicating through the lock housing with the void for receiving the band through the first slot, the void and through the second slot; and (b) the lock member includes a cylindrical exterior surface mounted in the void of the lock housing interior surface of the lock housing and defining a space between the cylindrical interior and exterior surfaces, the space and the thickness of the band being such as to provide progressively greater frictional engagement between the respective exterior and interior surfaces as the lock member is rotated from the unlocked to the locked positions.

8. A booster seat according to claim 7, wherein the first and second opposed slots are positioned for alignment with the slot in the rotatable lock member when the lock is in the unlocked position and positioned for a misalignment of about 90 degrees with the slot in the rotatable lock member in the locked position.

9. A booster seat according to claim 8, and including a handle carried by the rotatable lock member for manually moving the lock member between locked and unlocked positions.

10. A booster seat according to claim 1, wherein the lock comprises:

(a) first and second lock members positioned adjacent each other and having a respective band-engaging element defining a slot therebetween for receiving the band therethrough:

(b) a void formed by facing surfaces of the lock members and being sufficiently large to permit free passage of the band through the void in both the locked and unlocked lock positions:

(c) a lock operator cooperating with the lock members for (1) moving the lock members towards each other into the locked position whereby the band is clamped between the band-engaging elements; and (2) moving the band-engaging elements away from each other into the unlocked position whereby the band is allowed to move freely past the band-engaging elements.

11. A booster seat according to claim 10, wherein the lock members comprise blocks, at least one of the blocks having a concavity defining the void.

12. A booster seat according to claim 10, wherein the lock members comprise first and second blocks, each of the first and second blocks having a concavity, the respective concavities collectively defining the void.

13. A booster seat according to claim 1, wherein the lock comprises:

(a) first and second lock members positioned adjacent each other and having first and second pairs of spaced-apart band-engaging elements defining a slot therebetween for receiving the band therethrough:

(b) a void formed by facing surfaces of the lock members intermediate the first and second pairs of band-engaging elements, the void being sufficiently large to permit free passage of the band through the void in both the locked and unlocked lock positions;

(c) a lock operator cooperating with the lock members for:

(1) moving the lock members towards each other into the locked position whereby the band is clamped between the first and second pairs of band-engaging elements; and (2) moving the band-engaging elements away from each other into the unlocked position whereby the band is allowed to move freely past the first and second pairs of band-engaging elements.

14. A booster seat according to claim 13, wherein the lock members comprise blocks, having respective concavities formed by a pair of planar walls converging at a common intersection to define a notch.

15. A booster seat according to claim 13, wherein the lock operator comprises a cam roller.

16. A booster seat, comprising:

(a) a seat bottom for being supported on a vehicle seat:

(b) a seat back carried by the seat bottom for providing back support to a seat occupant;

(c) the seat back comprising:

(1) a first frame member;

(2) a second frame member mounted for slidable movement relative to the first frame member for increasing and decreasing the an effective length of the combined first frame member and second frame member; the second frame member including two longitudinally spaced-apart slots for receiving a flexible band therethrough; and (3) a headrest carried at a top end of the second frame member;

(d) a flexible band interconnecting the first and second frame members wherein relative movement between the first and second frame members causes movement of the band relative to the second frame member, the band having two opposed end portions stationarily mounted to the first frame member; and (e) a lock for being carried by one of the first or second frame members for engaging cooperation with the band, the lock being reciprocable between:

(1) a locked position wherein the lock locks the band against movement in first and second opposing directions of the second frame member; and (2) an unlocked position wherein the lock releases the band and allows movement of the second frame member in first and second opposing directions relative to the first frame member thereby adjusting the height of the seat back; the lock including a slot therein for receiving the band therethrough, wherein in the locked position the band is frictionally-engaged by the lock, and wherein in the unlocked position the band is released from frictional locking engagement with the lock.

17. A booster seat according to claim 16, wherein the lock comprises;

(a) a lock housing having a void therein;

(b) a rotatable lock member mounted in the void of the lock housing, the lock member including a slot therein for receiving the band therethrough, wherein in the locked position the band is frictionally-engaged by the lock housing, and wherein in the unlocked position the band is released from frictional locking engagement with the lock housing.

18. A booster seat according to claim 16, wherein one of the first and second frame members includes at least one slot therein extending along a longitudinal axis thereof, and the other of the first and second frame members includes a frame retainer extending through the slot and capturing the one of the first and second frame members for sliding movement along the axis of the slot.

* * * * *

UNITED STATES PATENT AND TRADEMARK OFFICE
CERTIFICATE OF CORRECTION

| | | |
|---|---|---|
| PATENT NO. | : 7,032,969 B1 | Page 1 of 1 |
| APPLICATION NO. | : 11/161833 | |
| DATED | : April 25, 2006 | |
| INVENTOR(S) | : Jerry Wayne Campbell | |

It is certified that error appears in the above-identified patent and that said Letters Patent is hereby corrected as shown below:

Column 7, line 45, delete "lock housing defining defines" and insert -- lock housing defines --.

Column 8, line 15, insert -- : -- after "for".

Column 8, line 51, delete "blocks[[,]] having" and insert -- blocks having --.

Column 8, line 64, delete "decreasing the an" and insert -- decreasing an --.

Signed and Sealed this

Seventh Day of August, 2007

JON W. DUDAS
*Director of the United States Patent and Trademark Office*